(12) United States Patent  
Shavell et al.

(10) Patent No.: US 10,193,899 B1  
(45) Date of Patent: Jan. 29, 2019

(54) ELECTRONIC COMMUNICATION IMPERSONATION DETECTION

(71) Applicant: Symantec Corporation, Mountain View, CA (US)

(72) Inventors: Michael Shavell, Marrimack, NH (US); Kevin Jiang, Waltham, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/748,658

(22) Filed: Jun. 24, 2015

(51) Int. Cl.
| | | |
|---|---|---|
| G08B 23/00 | (2006.01) | |
| G06F 12/16 | (2006.01) | |
| G06F 12/14 | (2006.01) | |
| G06F 11/00 | (2006.01) | |
| H04L 29/06 | (2006.01) | |
| H04W 4/02 | (2018.01) | |

(52) U.S. Cl.
CPC ........... *H04L 63/1416* (2013.01); *H04W 4/02* (2013.01)

(58) Field of Classification Search
CPC .............................. H04L 63/1416; H04W 4/02
USPC .......................................................... 726/22
See application file for complete search history.

(56) References Cited

U.S. PATENT DOCUMENTS

| | | | | |
|---|---|---|---|---|
| 7,684,783 B1* | 3/2010 | Vacon | ................... | H04W 12/06 370/338 |
| 7,970,894 B1* | 6/2011 | Patwardhan | .......... | H04W 12/12 370/254 |
| 8,069,483 B1* | 11/2011 | Matlock | ................. | H04W 12/12 713/154 |
| 8,191,143 B1* | 5/2012 | Lin | ...................... | H04L 63/1483 713/153 |
| 8,347,394 B1* | 1/2013 | Lee | ..................... | H04L 61/1511 726/22 |
| 8,418,249 B1* | 7/2013 | Nucci et al. | | |
| 9,088,894 B1* | 7/2015 | Kaushik | ................ | H04W 12/12 |
| 9,544,798 B1* | 1/2017 | Ahmadzadeh | ........ | H04W 24/08 |
| 2005/0144544 A1* | 6/2005 | Gariador | ............. | H04L 63/1408 714/724 |
| 2007/0025245 A1* | 2/2007 | Porras | ................... | H04W 99/00 370/229 |
| 2008/0109905 A1* | 5/2008 | Grosse | ................ | H04L 63/1458 726/23 |
| 2009/0094671 A1* | 4/2009 | Kurapati | ............. | H04L 63/1458 726/1 |
| 2010/0106966 A1* | 4/2010 | Santos | .................... | H04L 12/66 713/156 |

(Continued)

OTHER PUBLICATIONS

Abhay Kumar Rai; Different Types of Attacks on Integrated MANET—Internet Communication; International Journal of Computer Science and Security (IJCSS) vol. (4): Issue (3); year:2007; p. 265-274.*

*Primary Examiner* — Monjur Rahim

(74) *Attorney, Agent, or Firm* — Holland & Hart LLP

(57) ABSTRACT

Methods, apparatuses, and systems relating to narrow beam communications and wireless networking are disclosed. Exemplary methods for wireless networking and communications may include identifying a geographic area, receiving topography data related to the geographic area, analyzing the topography data, identifying a first line of sight path related to a first access point location and one or more customer premises device locations based at least in part on the analyzing, and identifying a second line of sight path based at least in part on a predetermined amount.

18 Claims, 8 Drawing Sheets

(56) References Cited

U.S. PATENT DOCUMENTS

| | | | |
|---|---|---|---|
| 2011/0252128 A1* | 10/2011 | Koide | H04L 63/1408 709/224 |
| 2013/0040603 A1* | 2/2013 | Stahlberg | H04L 63/126 455/410 |
| 2014/0325223 A1* | 10/2014 | Turgeman | H04L 63/1408 713/168 |
| 2014/0325682 A1* | 10/2014 | Turgeman | H04L 63/126 726/29 |
| 2015/0163734 A1* | 6/2015 | Park | H04W 48/20 370/338 |
| 2015/0295940 A1* | 10/2015 | Patel | H04L 63/107 726/29 |
| 2016/0277427 A1* | 9/2016 | Deshpande | H04L 63/1416 |
| 2016/0323311 A1* | 11/2016 | Kumar | H04W 12/12 |
| 2017/0163607 A1* | 6/2017 | Skuratovich | H04L 63/0428 |
| 2017/0213220 A1* | 7/2017 | Tomlinson, Jr. | G06Q 20/4014 |

\* cited by examiner

ELECTRONIC COMMUNICATION IMPERSONATION DETECTION

BACKGROUND

The present disclosure, for example, relates to communication systems, and more particularly to electronic communication impersonation detection.

Wired and wireless communication systems are widely deployed to provide various types of communication and functional features such as monitoring, communication, notification, and/or others. These systems may be capable of supporting communication between a user device and an apparatus, such as an access point, through one or more communication links, which may be wired and/or wireless.

As technology in the home, work place, and public areas continues to develop, the ability to secure and protect user information has become more difficult. In particular, certain types of wireless communication are subject to man-in-the-middle (MITM) attacks that may impersonate valid connections with a device, gather and/or receive information relating to the device, and engage in harmful, hostile behavior to steal information. One example of these devices is a "Pineapple" device that attacks Wi-Fi communications. Users of technology may be unaware of these MITM security and as a result may unknowingly divulge secure information to those breaching the system. Thus, there exists needs in the art to develop systems and methods for detecting impersonation devices and perform operations by other electronic devices to combat these hostile impersonators.

SUMMARY

As wireless communication continues to evolve, the use of Wi-Fi networks (among other types) in the home, office, restaurants, and other public areas by apparatuses capable of wireless communication is more frequent. Though widely used, Wi-Fi networks and other communication networks can be easily manipulated and hackers can impersonate valid connections using Wi-Fi Protected Access (WPA) security protocol (even using an otherwise-valid service set identifier (SSID) in an improper location) and access sensitive user information (e.g., passwords, credit card numbers, banking numbers, etc.) by replaying and/or resending requests and/or responses, among other techniques. While WPA2 security protocol provides extra layered protection and advantages, WPA security protocol remains susceptible to harmful MITM spoofing attacks of specific types. As a result, users often unknowingly divulge secure information that is tracked and/or intercepted by these impersonator hackers because the users are unaware of or oblivious to these attacks.

One development to provide better wireless network security includes methods and/or systems to track and detect impersonation devices. Often, unsuspecting users in Wi-Fi environments are susceptible to malicious attacks, including, but not limited to, MITM attacks, which can be very difficult to detect, particularly for less tech-savvy users. The present systems and methods relate to wireless communication to monitor, detect, and prevent attacks on communications networks, including, but not limited to, Wi-Fi.

According to at least one embodiment, computer-implemented methods for detecting electronic communication impersonation are disclosed. In some embodiments, the methods may include connecting to a first device in a geographic area via a wireless connection, initiating a request relating to the first device via the wireless connection, monitoring wireless communications within the geographic area, registering system events for a predetermined period based at least in part on the monitored wireless communications, and/or determining a suspicious event status based at least in part on the registering.

In some embodiments, the methods may include terminating the connection to the first device based at least in part on the determining. In some embodiments, the methods may include generating a notification based at least in part on the determining. In some embodiments, the notification may include a communication to a user device.

In some embodiments, the request may include one or more application layer protocol requests. In some embodiments, the request may be initiated by a user device. In some embodiments, monitoring wireless communications within the geographic area may include monitoring information relating to communication packets. In some embodiments, monitoring wireless communications may include monitoring for an echo of the request. In some embodiments, monitoring wireless communications may include monitoring for a later request initiated by a second device that is identical to the request.

In some embodiments, monitoring wireless communications may include monitoring for a later request identical to the request. In some embodiments, monitoring wireless communications may include monitoring a later request by comparing at least some content of the later request with at least some content of the request. In some embodiments, the methods may include monitoring a response that is based at least in part on the request. In some embodiments, monitoring wireless communications may include monitoring a later response by comparing at least some content of the response with at least some content of the later response.

In some embodiments, the response may include communication between an access point and/or an intermediate device. In some embodiments, the later response may include communication between the intermediate device and/or a user device. In some embodiments, the suspicious event status may indicate at least one of a qualitative measure or a quantitative measure of an impersonation process.

In some embodiments, the request may include a randomized request sent to a designated source before other wireless communications are sent. In some embodiments, determining the suspicious event status may be based at least in part on a response relating to the randomized request. In some embodiments, monitoring wireless communications within the geographic area may include monitoring public Wi-Fi traffic within the geographic area.

In at least one embodiment, computing devices for detecting electronic communication impersonation are disclosed. In some embodiments, a computing device may include a processor and/or memory in electronic communication with the processor. In some embodiments, the memory may store computer executable instructions that when executed by the processor cause the processor to perform the steps of connecting to a first device in a geographic area via a wireless connection, initiating a request relating to the first device via the wireless connection, monitoring wireless communications within the geographic area, registering system events for a predetermined period based at least in part on the monitored wireless communications, and/or determining a suspicious event status based at least in part on the registering.

In some embodiments, monitoring wireless communications may include monitoring a later request by comparing at least some content of the later request with at least some content of the request. In some embodiments, the request may include a randomized request. In some embodiments, determining the suspicious event status may be based at least in part on a response relating to the randomized request.

In at least one embodiment, non-transitory computer-readable storage mediums storing computer executable instructions are disclosed. In some embodiments, the stored computer executable instructions may be executed by a processor to cause the processor to perform the steps of connecting to a first device in a geographic area via a wireless connection, initiating a request relating to the first device via the wireless connection, monitoring wireless communications within the geographic area, registering system events for a predetermined period based at least in part on the monitored wireless communications, and/or determining a suspicious event status based at least in part on the registering.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims. Features from any of the above-mentioned or below-described embodiments may be used in combination with one another in accordance with the general principles described here. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments. These drawings are incorporated in this disclosure and are a part of the specification. Together with the following description, these drawings demonstrate and explain various principles of this disclosure.

Figure 1:
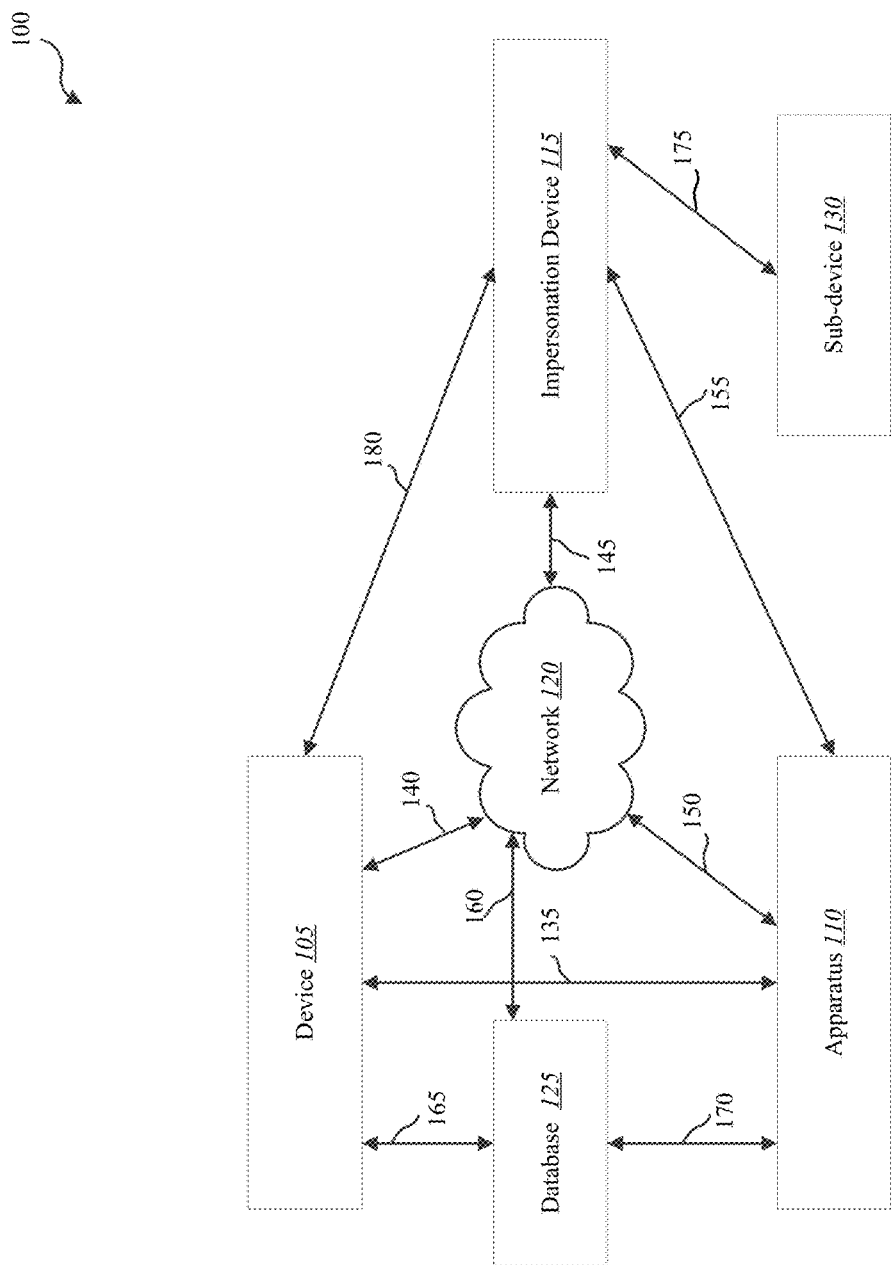
FIG. 1 depicts a block diagram illustrating embodiments in which the present systems and methods may be implemented.

While the embodiments described here are susceptible to various modifications and alternative forms, specific embodiments have been shown by way of example in the drawings and will be described in detail. However, the exemplary embodiments described here are not intended to be limited to the particular forms disclosed or to limit other forms disclosed and/or undisclosed. Rather, this disclosure covers all modifications, equivalents, and/or alternatives falling within the scope of the claims.

DETAILED DESCRIPTION

One of the major roles of technology has been to improve the quality and speed of accessing and sharing information. Through the use of technology in recent years, the ability to access and share information has greatly improved. However, these resulting improvements have also created increased risks relating to users' information. Attacks through wireless networks, such as Wi-Fi networks, provide one example. Because most public Wi-Fi connections utilize an open network, users do not typically check the security of a network that a user device has joined. As a result, it can be easy for hackers using impersonation devices (among others) to perform various attacks, such as MITM attacks, and access secure information provided unknowingly by users through what generally appears to them as valid connections.

The present systems and methods relate, in some embodiments, to one or more devices and/or apparatuses capable of monitoring and detecting "fake" or unsecure network connections used for malicious attacks. The various systems and methods may detect suspicious activity and provide a user with a notification warning of the suspected attack, allowing the user to terminate a suspicious and/or compromised connection to prevent data theft (among other things), and search for a more secure and reliable connection. The various systems and methods may also detect suspicious activity and may automatically terminate the connection relating to the impersonation device. Detecting suspicious activity may include, but is not limited to, establishing an electronic communication connection, initiating and/or sending a request, monitoring Wi-Fi traffic and communications in a geographic area, registering certain actions that occur via the Wi-Fi traffic, and determining suspicious activity statuses.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is a block diagram illustrating embodiments of a system 100 in accordance with various aspects of the disclosure. System 100 may include device 105, apparatus 110, impersonation device 115, network 120, and/or database 125, among other components. The network 120 may provide and/or facilitate communication between one or more components, such as device 105, impersonation device 115, apparatus 110, database 125, and/or other devices capable of wireless and/or wired communication.

In some embodiments, system 100 may include a device 105. In some embodiments, examples of device 105 may include, but are not limited to, a cellular phone, a personal digital assistant (PDA), a wireless communication device, a handheld device, a tablet computer, a wearable device, laptop computer, a cordless phone, a wireless local loop (WLL) station, a display device (e.g., TVs, computer monitors, etc.), a printer, a camera, a key fob, some combination, and/or the like. A device 105 may also include or be referred to by those skilled in the art as a user device, a client device, a smartphone, a BLUETOOTH® device, a Wi-Fi device, a mobile station, a subscriber station, a mobile unit, a subscriber unit, a wireless unit, remote unit, a mobile device, a wireless device, a wireless communications device, a remote device, a mobile terminal, a remote terminal, a handset, a user agent, a mobile client, a client, some combination, and or some other suitable terminology.

In some embodiments, system 100 may include one or more impersonation devices 115. In some embodiments impersonation device 115 may include a device capable of and/or configured to perform a MITM attack on one or more other devices, including by using a "Pineapple" device as one example of a MITM attacker, among others.

In some cases, these impersonation devices are configured to present themselves as legitimate electronic communication-related devices (e.g., Wi-Fi access points) and may even mimic already-known (to the user's device) legitimate wireless access points (including a user's "Home" and/or favorite eatery). By mimicking the legitimate access point, an impersonation device 115 may trick a device 105 and/or user into thinking the impersonation device is a legitimate connection and the impersonation device 115 can then obtain data from the user's Wi-Fi usage, including passwords, account information, financial, and/or identity related information, among others.

In some embodiments, examples of an impersonation device 115 may include, but are not limited to, a cellular phone, a personal digital assistant (PDA), a wireless communication device, a handheld device, a tablet computer, a wearable device, laptop computer, a cordless phone, a wireless local loop (WLL) station, a display device (e.g., TVs, computer monitors, etc.), a printer, a camera, a key fob, some combination, and/or the like. An impersonation device 115 may also include or be referred to by those skilled in the art as a user device, a client device, a smartphone, a BLUETOOTH® device, a Wi-Fi device, a mobile station, a subscriber station, a mobile unit, a subscriber unit, a wireless unit, remote unit, a mobile device, a wireless device, a wireless communications device, a remote device, a mobile terminal, a remote terminal, a handset, a user agent, a mobile client, a client, some combination, and or some other suitable terminology.

In some embodiments, system 100 may include one or more apparatuses 110. In some embodiments, examples of an apparatus 110 may include, but are not limited to, an access point, a cellular phone, a personal digital assistant (PDA), a wireless communication device, a handheld device, a tablet computer, a wearable device, laptop computer, a cordless phone, a wireless local loop (WLL) station, a display device (e.g., TVs, computer monitors, etc.), a printer, a camera, a key fob, some combination, and/or the like. An apparatus 110 may also include or be referred to by those skilled in the art as an wireless access point, a user device, a client device, a smartphone, a BLUETOOTH® device, a Wi-Fi device, a mobile station, a subscriber station, a mobile unit, a subscriber unit, a wireless unit, remote unit, a mobile device, a wireless device, a wireless communications device, a remote device, a mobile terminal, a remote terminal, a handset, a user agent, a mobile client, a client, some combination, and or some other suitable terminology.

In some embodiments, one or more components of system 100 may attempt to and/or establish one or more communication links between two or more components of system 100 and/or between at least one component of system 100 and another electronic device. As one example, in some embodiments, one or more of communication links 135, 140, and/or 150 may represent a desired and/or a conventional connection between and/or communication link 140 to network 120 to communication link 150, may represent the communication route desired by a user to transmit information. But, in some embodiments, through the use of impersonation device 115, the communication route may be modified and/or different based on one or more communication connections to transmit information through one or more communications link (e.g., communication link 180, 140, 145) to impersonation device 115 and through a communication link (e.g., communication link 145, 150, 155) to apparatus 110, among other system 100 components.

In some embodiments, device 105 may connect and/or otherwise communicate directly with impersonation device 115 (e.g., via communication link 180), which may connect and/or otherwise communicate directly with apparatus 110 (e.g., via communication link 155). In some embodiments, the one or more communication links may include communicating via network 120 and/or directly between one or more system 100 components (e.g., device 105, database 125, apparatus 110).

In some embodiments, impersonation device 115 may be individually connected to a sub-device 130 and may transmit and/or receive data, instructions, functions, actions, and/or other information with the sub-device 130 via one or more communication links 175, among others. For example, impersonation device 115 may impersonate apparatus 110 and copy information that impersonation device 115 receives from device 105 via network 120 and/or communication link 180 (among others), and then forward the information to sub-device 130 via communication link 175 to capture, process, store, and/or otherwise perform one or more operations and/or functions. In another example, impersonation device 115 may impersonate device 105 and copy information that impersonation device 115 receives from apparatus 110 via network 120 and/or communication link 155 (among others), and then forward the information to sub-device 130 via communication link 175 to capture, process, store, and/or otherwise perform one or more operations and/or functions.

In some embodiments, a device 105 may communicate with an apparatus 110 and/or impersonation device 115 via network 120 and/or communication links 135, 140, and/or 180 (among others). If device 105 communicates with impersonation device 115 via network 120 and/or communication link 180, in some embodiments, impersonation device 115 may then communicate with apparatus 110 via network 120 and/or communication link 155. Similarly, in some embodiments, apparatus 110 may communicate with device 105 and/or impersonation device 115 via network 120 and/or communication links 135 and 155. If apparatus 110 communicates with impersonation device 115 via network 120 and/or communication link 155, in some embodiments, impersonation device 115 may then communicate with device 105 via network 120 and/or communication link 180.

In some embodiments device 105 may attempt to connect with apparatus 110 via network 120 or communication link 135. However, impersonation device 115 may intercept the connection between device 105 and apparatus 110. In accordance with various aspects of the disclosure, device 105 may detect impersonation device 115 and notify a user of device 105 of the unwanted connection interception by impersonation device 115 and/or terminate the connection with one or more components, such as impersonation device 115.

In some embodiments, device 105 may attempt to connect with apparatus 110 via communication link 140 to network 120 to communication link 150. However, impersonation device 115 may intercept the connection between device 105 and apparatus 110. The intercepted connection between device 105 and apparatus 110 may follow from device 105 to communication link 180 to impersonation device 115 to communication link 145 to network 120 to communication link 150 to apparatus 110. In accordance with various aspects of the disclosure device 105 may detect impersonation device 115 and terminate any communication link with one or more components of system 100, including but, not limited to, a user of device 105 based at least in part on the unwanted connection interception.

In some embodiments, one or more devices illustrated in system 100 may communicate with and/or link to database 125. In some embodiments, database 125 may include stored settings, information, device communication, protocols, wireless traffic records and/or other information, instructions, some combination and/or other information. In some embodiments, instructions may include instructions related to information generated, transmitted, received, authenticated, modified, and/or otherwise related to at least one of device 105, apparatus 110, network 120, impersonation device 115, some combination, and/or other components of system 100 and/or other systems. In some embodiments, relevant information and/or instructions related to and/or based at least in part on one or more requests, wireless connection related information, initiation related information, monitoring related information, registered event related information, determination related information, suspicious activity related information, notification and/or termination related information, some combination, and/or other information relating to the present systems and methods may be included and/or stored in database 125.

In some embodiments, device 105, apparatus 110, impersonation device 115, and/or other components may access and/or receive settings, information, device communication, protocols, wireless traffic records and/or other information, instructions, some combination and/or other information in database 125 over network 120 indirectly and/or directly. In some embodiments, database 125 may be internal or external to one or more components of system 100 (i.e., connected to a device 105 through network 120 and/or connected directly and/or contained within (an integral and/or a non-integral housing) to one or more components of system 100). For example, at least a portion of database 125 may be internal and/or external to other components of system 100, such as apparatus 110 and/or device 105. In some embodiments, database 125 may be internal and/or external to one or more remote servers. Alternatively and/or additionally, one or more remote servers may be present as components of system 100, among others, and may or may not relate to one or more databases 125.

In some embodiments, network 120 may include cloud networks, local area networks (LAN), wide area networks (WAN), virtual private networks (VPN), wireless networks (using 802.11, for example), cellular networks (using 3G and/or LTE, for example), and/or other networks. In some embodiments, the network 120 may include the internet.

Figure 2:
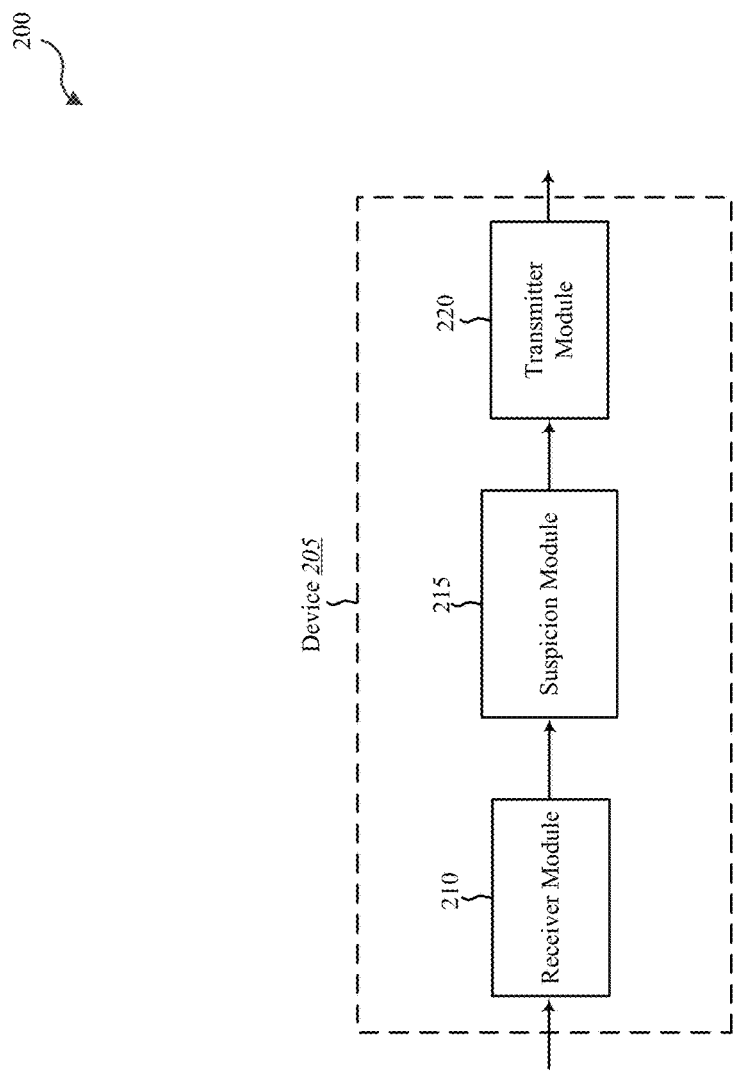
FIG. 2 depicts a block diagram illustrating embodiments in which the present systems and methods may be implemented.

FIG. 2 shows a block diagram 200 of a device 205 for use in electronic communication, in accordance with various aspects of this disclosure. In some embodiments, the device 205 may be an example of one or more aspects of a device 105 described with reference to FIGS. 1 and others. In some embodiments, the device 205 may be an example of one or more aspects of an apparatus 110 described with reference to FIGS. 1 and others. In some embodiments, the device 205 may be an example of one or more aspects of a database 125 described with reference to FIGS. 1 and others. In some embodiments, the device 205 may be an example of an access point, a remote server, an impersonation device 115, user device, client device, some combination, and/or another one or more devices. In some embodiments, references to device 205 relate to and/or incorporate discussion of other specifically-named devices (e.g., device 105) and/or other devices that may include similar and/or related characteristics, and/or include similar and/or related functions.

In some embodiments, the device 205 may include a receiver module 210, a suspicion module 215, and/or a transmitter module 220, among other things. The device 205 may also be or include a processor. Each of these modules may be in communication with each other directly and/or indirectly.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to and/or capable of receiving information through wired and/or wireless connections from and/or relating to one or more components of system 100 and/or other systems, including but not limited to one or more access points, devices 105, apparatuses 110, impersonation devices 115, databases 125, remote servers, and/or information from device 205 (including from another module such as suspicion module 215), some combination, and/or others. Information may be passed on to the suspicion module 215, the transmitter module 220, and/or to other components of the device 205 and/or a system, such as system 100, among others.

The suspicion module 215 may perform one or more operations relating to an apparatus, an access point, a device, and/or a remote server (including, but not limited to, apparatus 110, an access point, system components, and/or a remote server), receiver module 210, transmitter module 220, and/or others modules and/or components, that may be configured to, relate to, and/or capable of performing suspicion-related communications, actions, operations, initiations, some combination, and/or other functions. The operations, features, and methods relating to suspicion module 215 may be performed regardless of whether the system includes suspicion-related device, an impersonation device, an access point, a device, and/or which system component may perform one or more suspicion-related narrow beam communications, actions, operations, initiations, and/or other function. References to a device 205 and/or suspicion module 215 (and variations) include all functions, features, and capabilities disclosed with respect to other apparatuses, access points, remote servers, and devices, unless otherwise specifically noted. Additionally, references to an apparatus 110 and/or suspicion module 215 (and variations) include all functions, features, and capabilities disclosed with respect to other apparatuses, access points, remote servers, and devices, unless otherwise specifically noted.

The transmitter module 220 may transmit the one or more signals received from other components of the device 205 and/or other components of any system, such as system 100. The transmitter module 220 may transmit request data and/or information, monitoring data and/or information, initiation data and/or information, geographic area data and/or information, communication connection data and/or information, wireless communication related data and/or information, system event data and/or information, data that has an action performed on it, summaries, analyses, determinations, initiations, operations, instructions, alerts, statuses, errors, notification related and/or termination related data and/or information, information related to any of these and/or other applicable data and/or information types, some combination, and/or other data and/or information relating to one or more system components, network design, performance, and/or organization, and/or suspicion detection, among other things.

In some examples, the transmitter module 220 may be collocated with the receiver module 210 in a transceiver module. In other examples, the transmitter module 220 may not be collocated with the receiver module 210 in a transceiver module.

Figure 3:
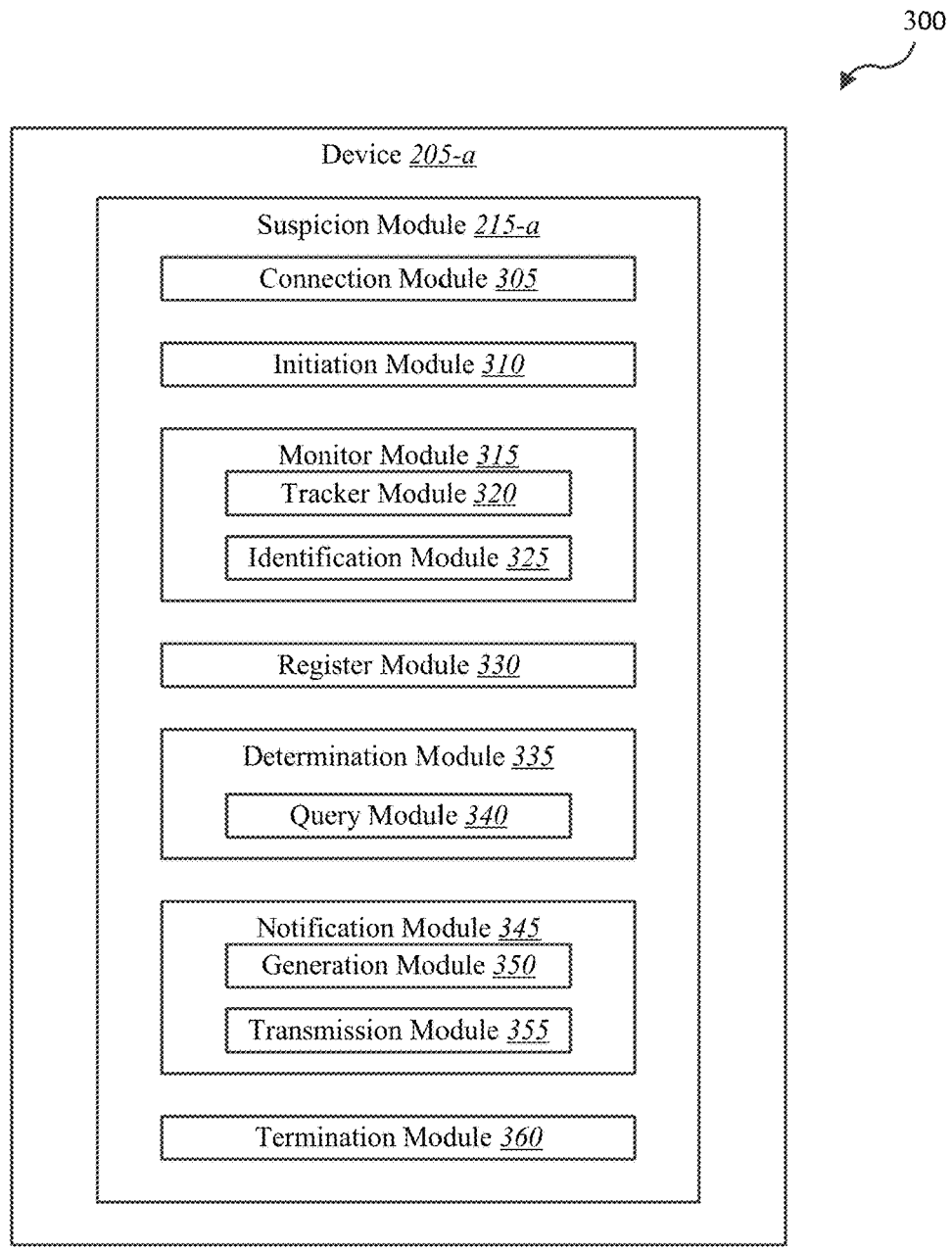
FIG. 3 depicts a block diagram illustrating embodiments in which the present systems and methods may be implemented.

FIG. 3 shows a block diagram 300 of a device 205-*a* for use in electronic communication in accordance with various aspects of this disclosure. The device 205-*a* may be an example of one or more aspects of a device 105 described with reference to FIG. 1, a device 205 described with reference to FIG. 2, and others. In some embodiments, device 205-*a* may include a suspicion module 215-*a*, among others. In some embodiments, device 205-*a* may also be or include a processor.

The components of the device 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The suspicion module 215-*a* may include one or more connection modules 305, initiation modules 310, monitor modules 315, register modules 330, determination modules 335, notification modules 345, termination modules 365, some combination, and/or other modules. The suspicion module 215-*a* may also be or include a processor that executes specific, particularly-programmed instructions. Each of these modules may be in communication with each other directly and/or indirectly. The suspicion module 215-*a* may be implemented to detect one or more factors and/or parameters related to events indicating suspicious activity related to one or more wireless communications, such as one or more Wi-Fi communications.

In some embodiments, suspicion module 215-*a* may include one or more connection modules 305. Connection module 305 may search for wireless networks and/or devices capable of wireless communication, such as one or more apparatuses 110, which may include one or more access points. In some embodiments connection module 305 may search for wireless networks and/or devices capable of wireless communication, which may include one or more impersonation devices 115, as described with reference to FIG. 1. In some embodiments, the connection module 305 may then connect to and/or facilitate electrical communication relating to wired and/or wireless communications.

In some embodiments, connection module 305 may communicate with the joined network, device, apparatus, access point, impersonation device, some combination, and/or other components. The connection module 305 may be capable of and/or facilitate the storing of a familiar and/or trusted wireless connection with one or more other components, such as apparatus 110. In some embodiments, connection module 305 may facilitate communication when device 205-*a* is located within, immediately next to, adjacent to, and/or otherwise related to one or more geographic areas associated with and/or relating to one or more system components, such as an apparatus and/or an access point. In some embodiments, one or more geographic areas may be based entirely on, based partially on, and/or otherwise relate to one or more devices (e.g., device 205-*a*). In some embodiments, one or more geographic areas may be based entirely on, based partially on, and/or otherwise relate to one or more apparatuses (e.g., apparatus 110). In some embodiments, one or more geographic areas may be based entirely on, based partially on, and/or otherwise relate to one or more system components (e.g., devices, apparatuses, impersonation devices, etc.). In some embodiments, one or more geographic areas may be based at least partially on signal strength, antenna strength, one or more relative positions, one or more electronic devices, apparatuses, and/or components (among others), relative positioning and/or orientation of one or more electronic devices, apparatuses, and/or components (among others), some combination, and/or one or more other factors and/or functions.

In some embodiments, suspicion module 215-*a* may include one or more initiation modules 310. In some embodiments, the initiation module 310 may initiate and/or send a request relating to the network and/or an apparatus. In some embodiments, an initiation may relate to a request relating to one or more devices, apparatuses, system components, some combination, and/or other others connected by connection module 305. In some embodiments, the request may include, but is not limited to one or more: requests to monitor wireless network activity, application layer protocol requests, other layer protocol requests, protected requests, randomized requests, confirmation related requests, authentication related requests, validation related requests, some combination, and/or other information and/or data. In some embodiments, the request may include and/or relate to, but is not limited to, HTTP, FTP, DNS, Telnet, etc.

In some embodiments, suspicion module 215-*a* may include one or more monitor modules 315. In some embodiments, monitor module 315 may be used to monitor network communications, including wired and/or wireless communication, relating to one or more geographic areas. In some embodiments, monitor module 315 may monitor network communications related to one or more devices 205-*a*. In some embodiments, monitor module 315 may monitor network communications related to one or more apparatuses 110. In some embodiments, monitor module 315 may monitor network communications related to one or more impersonation devices 115. In some embodiments, one or more monitor modules 315 relating to one or more devices 205-*a* may monitor network communications related to devices other than the one or more devices 205-*a*. In some embodiments, one or more monitor modules 315 relating to one or more devices 205-*a* may monitor network communications related to devices other than the one or more devices 205-*a* and/or the one or more devices 205-*a*.

In some embodiments, monitor module 315 may employ one or more methods, alone and/or in combination with other modules, elements, and/or components, to monitor network communications, such as wireless communications. Examples of these methods may include utilizing one or more of promiscuous mode, modifying user level permissions, modifying one or more drivers, some combination, and/or other methods. In general systems are designed to filter out the vast majority of local traffic in an effort to increase operating speeds and/or required processing power, in some embodiments, the present systems and methods are designed to instead capture, record, and/or otherwise utilize all wireless communications sent (by one device and/or apparatuses, and/or other devices and/or apparatuses). In some embodiments, monitor module 315 may monitor at least a portion of all wireless communications within a geographic area. In some embodiments, monitor module 315 may monitor all wireless communications within a geographic area. In some embodiments, monitor module 315 may monitor at least some wireless communications relating to one or more devices, apparatuses, and/or other components. In some embodiments, monitor module 315 may monitor all wireless communications relating to one or more devices, apparatuses, and/or other components.

In some embodiments, monitor module 315 may include a tracker module 320 and/or, an identification module 325. In some embodiments, tracker module 320 may be used to track communication between user devices within a geographic area. Tracker module 320 may listen in different modes (e.g., promiscuous mode, listening mode) to all traffic within a geographic area.

In some embodiments, tracker module 320 may initiate and/or send one or more requests relating to test traffic. In some embodiments, the requests may include protected requests, which may include, but are not limited to, encrypted requests, authentication requests, randomized requests, requests sent to a designated, trusted source (e.g., a known, legitimate site, legitimate source, a past source, a past site), some combination, and/or other request types.

In some embodiments, the requests may include one or more randomized requests. In some embodiments, the requests may include one or more randomized requests sent before other requests and/or communications. In some embodiments, the requests may include one or more randomized requests sent as an initial step to ensure a legitimate connection and avoid any MITM attacks, before additional communications and/or communications containing sensitive and/or confidential information. In some embodiments, randomized requests may include at least some random information that can be initiated and/or sent through the network. In some embodiments, randomized requests may be sent to designated address and/or site. In some embodiments, randomized requests may include 128 bit requests, among others. Such randomized requests may be sent before other network communications and/or before a specific type of communication, which may, in some embodiments, help ensure that the wireless connection is reliable and does not include a MITM impersonation device (e.g., Pineapple device).

In some embodiments, by sending randomized requests to one or more designated addresses and/or sites, and then monitoring one or more responses (and/or the lack thereof) via tracker module 320, monitor module 315 may provide at least some evidence of impersonation based at least in part on one or more responses (and/or the lack thereof). In some embodiments, monitor module 315 may monitor for network communications to determine one or more similarities between a second request and a first request, where the first request may precede the second request. In some embodiments, this may be based on a textual and/or other comparison to monitor whether two or more requests are identical, at least partially similar, contain at least some of the same content, that a second request includes an echo of a first request, some combination, and/or otherwise the same, similar, and/or different.

In some embodiments, identification module 325 may identify the type of network, device, and/or apparatus related to and/or connected by connection module 305 and/or one or more other modules, devices, and/or apparatuses, etc. In some embodiments, this identification may be based at least in part on one or more of names, identifiers, MAC addresses, SSIDs, BSSIDs, probe requests, parameters, characteristics, behaviors, communications, device locations, apparatus locations, component locations, some combination, and/or other information.

In some embodiments, suspicion module 215-*a* may include one or more register modules 330. Register module 330 may be used to register one or more system events for a predetermined period. In some embodiments, the system events may include initiations, transmissions, echoes, request replays, retransmissions of identical requests, and/or other operations relating to one or more requests, network communications, request responses, data packets, which may in turn relate to and/or be sent by one or more devices, apparatuses, impersonation devices, components, some combination, and/or other electronic devices.

In some embodiments, the system events may relate to one or more requests and/or one or more responses relating to one or more requests. For example, when monitor module 315 detects a second request that is later in time but contains the same information being processed at a second device (e.g., impersonation device 115), then a system event may be registered. In some embodiments, this registering of one or more system events may be based at least in part on monitored wireless communications at least relating to monitor module 315. In some embodiments, this registering of one or more system events may be based at least in part on one or more actions, operations, and/or functions performed by one or more other modules of suspicion module 215-*a*. Register modules 330 may record the information gathered by the monitor module 315, including the responses received to the test traffic sent by the tracker module 320. In some embodiments, a predetermined period may include a time related to a number of monitored network communications, a fixed time period (e.g., 1 minute, 30 seconds, 3 seconds, 2 seconds, a number of milliseconds, a number of microseconds). In some embodiments, one or more components of a device 205-*a* may store one or more system events, in local memory and/or in remote memory via one or more other components.

In some embodiments, suspicion module 215-*a* may include one or more determination modules 335. In some embodiments, determination module 335 may be used to determine a suspicious event status. In some embodiments, determination module 335 may determine a suspicious event status based at least in part on the information gathered at and/or by register module 330 and/or some other module of suspicion module 215-*a*, among others. In some embodiments, determination module 335 may perform one or more operations, calculations, comparisons, analyses, functions, judgments, assessments, and/or other operations. In some embodiments, determination module 335 may perform one or more actions based at least in part on one or more requests and/or responses, whether related and/or unrelated. In some embodiments, a suspicious event status may relate to a response relating to a randomized requests.

For example, after a randomized request is initiated and/or sent, if no response is received by the initiating and/or sending device, a suspicious event may be registered. Alternatively and/or additionally, other actions and/or characteristics relating to one or more different and/or same requests and/or responses may influence a determination regarding a suspicious event. In some embodiments, determination module 335 may compile one or more registered system events and/or the characteristics and/or specifics surrounding those events to make a determination regarding a suspicious event status.

In some embodiments, a suspicious event status may be and/or be based on one or more qualitative measures and/or a quantitative measure, including, but not limited to, one or more confidence levels, confidence intervals, likelihoods relating to impersonation (e.g., low, medium, high, very high), probabilities, trends, indicator levels, numerical values, some combination, and/or others. In some embodiments, one or more suspicious event statuses may be determined and then one or more actions may be performed based at least in part the one or more determinations.

In some embodiments, the determination module 335 may include a query module 340. Query module 340 may query (one or more other modules, devices, apparatuses, databases, and/or other component and/or elements) and/or search the information gathered at and/or by one or more other modules, devices, apparatuses, databases, and/or other component and/or elements, such as register module 330. In some embodiments, query module may query received and/or stored network traffic. If query module 340 receives information and/or data indicating that no traffic (e.g., requests, responses, and/or other communications) was repeated, determination module 335 may determine that the network and/or apparatus (and/or other components) connected by connection module 305 to be safe and/or lacking impersonation by an impersonation device 115. However, if query module 340 finds that traffic was repeated, was substantially similar based on one or more comparisons, and/or indicated impersonation, determination module 335 may determine that the network and/or apparatus joined by connection module 305 to be unsafe and may modify one or more suspicious event statuses.

In some embodiments, suspicion module 215-*a* may include one or more notification modules 345. In some embodiments, notification module 345 may be used to notify one or more users, devices, apparatuses, network administrators, and/or others of the security of a network, device, and/or apparatus based at least in part on the determinations made by determination module 335. In some embodiments, notification module 345 may include a generation module 350 and/or a transmission module 355. In some embodiments, the generation module 350 may be used to generate one or more notifications relating to one or more operations performed by one or more modules of suspicion module 215-*a*, including, but not limited to, determinations made by determination module 335. In some embodiments, transmission module 355 may be used to transmit one or more notifications to a user, a device, an apparatus, a remote server, some combination, and/or other components. In some embodiments, notifications may be of different types, levels, and/or may include various types of information, including information relating to any module of suspicion module 215-*a* (among others). In some embodiments, notifications may be urgent and describe determinations indicating an adverse and/or hostile suspicious event statuses. In some embodiments, notifications may be information and non-urgent, and describe determinations indicating an likelihood and/or a relatively lower confidence level indicating an adverse and/or a hostile suspicious event statuses.

In some embodiments, suspicion module 215-*a* may include one or more termination modules 360. In some embodiments, termination module 360 may be used to terminate a connection made by the connection module 305 based at least in part on the one or more determinations of the determination module 335. In some embodiments, termination module 360 may be used to terminate one or more connections made by the connection module 305 based at least in part on one or more notification received by the notification module 345.

In some embodiments, termination module 360 may automatically terminate one or more connections relating to connection module 305. In some embodiments, termination module 360 may terminate one or more connections relating to connection module 305 based at least in part on one or more notifications relating to notification module 345. In some embodiments, termination module 360 may terminate one or more connections relating to connection module 305 based at least in part on information, data, actions, instructions, requests, some combination, and/or other information received from a user, a network administrator, a device, an apparatus, and/or a component.

In some embodiments, termination module 360 may terminate one or more connections relating to connection module 305 based at least in part on failing to receive information, data, actions, instructions, requests, some combination, and/or other information received from a user, a network administrator, a device, an apparatus, and/or a component. In some embodiments, notification module 345 may provide notification of an unsecure connection and/or facilitate manual termination and/or condition termination of one or more connections based at least in part on additional information, data, actions, instructions, requests, some combination, and/or other information received from a user, a network administrator, a device, an apparatus, and/or a component.

Figure 4:
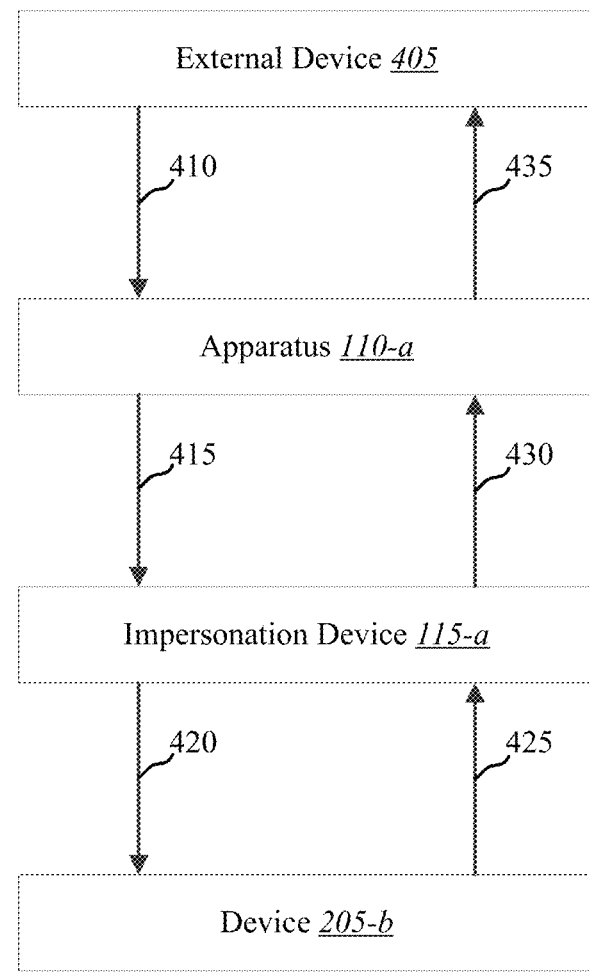
FIG. 4 depicts a block diagram illustrating embodiments in which the present systems and methods may be implemented.

FIG. 4 illustrates an example of a system 400 in accordance with various aspects of this disclosure. System 400 may include device 205-*b*, impersonation device 115-*a*, apparatus 110-, external device 405, and/or other components. As stated elsewhere, references to device 205-*b*, impersonation device 115-*a*, apparatus 110-*a*, relate to and/or incorporate discussion of other relatedly-named units and/or other units that may include similar and/or related characteristics, and/or include similar and/or related functions.

In some embodiments, external device 405 may be a remote server and/or another system-related component that may fulfill one or more requests and/or provide one or more responses, among other things.

As discussed above, in some embodiments, one or more non-impersonator components of a system (e.g., system 100) may monitor at least some, if not all, wireless communications transmitted and/or received within a geographic area, including those relating to and/or between other devices.

In some embodiments, device 205-*b* may initiate and/or send one or more requests to one or more other devices. In some embodiments, device 205-*b* may send request 425 to another device that device 205-*b*, via a connection, that appears to be reliable and/or safe. In some cases, however, this connection may include an impersonation device (initially unknown to device 205-*b* and/or an associated user). In some embodiments, after device 205-*b* initiates and/or sends a request 425, impersonation device 115-*a* receives the request 425 and then sends request 430 to an apparatus 110-*a* (which may be an example of an access point, among other things).

In some embodiments, request 430 may be determined as (based on one or more operations of one or more modules of suspicion module 215-*a* and/or others) identical to, substantially similar to, nearly identical to request 425. In some embodiments, request 430 may be determined as (based on one or more operations of one or more modules of suspicion module 215-*a* and/or others) an echo of request 425 that is transmitted after request 425 (or in some embodiments, at a different time than request 425). In some embodiments, request 430 may be determined as (based on one or more operations of one or more modules of suspicion module 215-*a* and/or others) a replay, a retransmission, and/or a rebroadcast, of request 425 that is transmitted after request 425 (or in some embodiments, at a different time than request 425). In some embodiments, this comparison and/or evaluation of request 430 and request 425 may be based on monitoring one or more wireless communications of one or more components in one or more geographic areas.

In some embodiments, apparatus 110-*a* may send the request 435 and/or other information and/or data to an external device 405 to fulfill request 425 of device 205-*b*. For example, if request 425 included an HTTP request to get information from one or more sources (e.g., www.google.com, www.espn.com) relating to external device 405, and an impersonation device replays request 425 as request 430 to apparatus 110-*a*, then apparatus 110-*a* will send request 435 to external device 405 to fulfill the request.

In some embodiments, in response to one or more requests (or separate and/or independent from one or more requests), external device may provide response 410 to apparatus 110-*a*. Based at least in part on response 410, apparatus 110-*a* may provide response 415 to impersonation device 115-*a*. Then, in some embodiments, impersonation device 115-*a* may provide response 420 to device 205-*b*.

In some embodiments, response 420 may be determined as (based on one or more operations of one or more modules of suspicion module 215-*a* and/or others) identical to, substantially similar to, nearly identical to response 415 (and/or response 410). In some embodiments, response 420 may be determined as (based on one or more operations of one or more modules of suspicion module 215-*a* and/or others) an echo of response 415. In some embodiments, response 420 may be determined as (based on one or more operations of one or more modules of suspicion module 215-*a* and/or others) a replay, a retransmission, and/or a rebroadcast, of response 415.

In some embodiments, response 420 may be at least partially different from response 415. In some embodiments, impersonation device 115-*a* may inject at least some new information into response 420 using one or more spoofing methods. Based on one or more operations, such as comparisons and/or evaluations of response 415 and 420, it may be determined that impersonation device injected new information into response 420. In some embodiments, this new information may be hostile (attempting to track, sift, capture, record, and/or otherwise get data from a response and/or a request relating to device 205-*b*) and/or non-hostile. In other embodiments, the new information may be a malicious malware attack relating to device 205-*b*, and may include tracking information, virus information, and/or other information.

In some embodiments, determining whether impersonation device 115-*a* has injected information (as opposed to distinguishing between unrelated responses 415 and 420), may be based on one or more comparisons and/or evaluations of the requests, the responses, information relating to either and/or both types, and/or other data and/or information. In some embodiments, determining whether impersonation device 115-*a* has injected information (as opposed to distinguishing between unrelated responses 415 and 420), may be based on comparisons, evaluations, and/or other operations relating to text, including, but not limited to HTML information, JavaScript information, TCP information, HTTP information, session information, header information, packet information, some combination, and/or other information.

In some embodiments, one or more comparisons and/or evaluations of response 415, response 420, and/or response 410 may be based on monitoring one or more wireless communications of one or more components in one or more geographic areas. In some embodiments, this comparison and/or evaluation may relate to textual, numerical, and/or other comparisons of the requests and/or responses, among other methods.

Moreover, in some embodiments, the methods and/or the systems discussed with respect to FIG. 4 may be alternatives of other methods and/or systems. For example, the comparison and/or the monitoring of requests and/or responses may be one alternative to the randomized requests methods and/or systems disclosed herein. Additionally, in some embodiments, the methods and/or the systems discussed with respect to FIG. 4 may be additional methods and/or systems performed in addition to other methods, which provide additional protection. For example, the comparison and/or the monitoring of requests and/or responses may be performed in addition to the randomized requests methods and/or systems disclosed herein. In some embodiments, various steps and/or operations of one or more methods may be performed before, in conjunction with, simultaneously with, and/or after other steps and/or operations of one or more methods.

Figure 5:
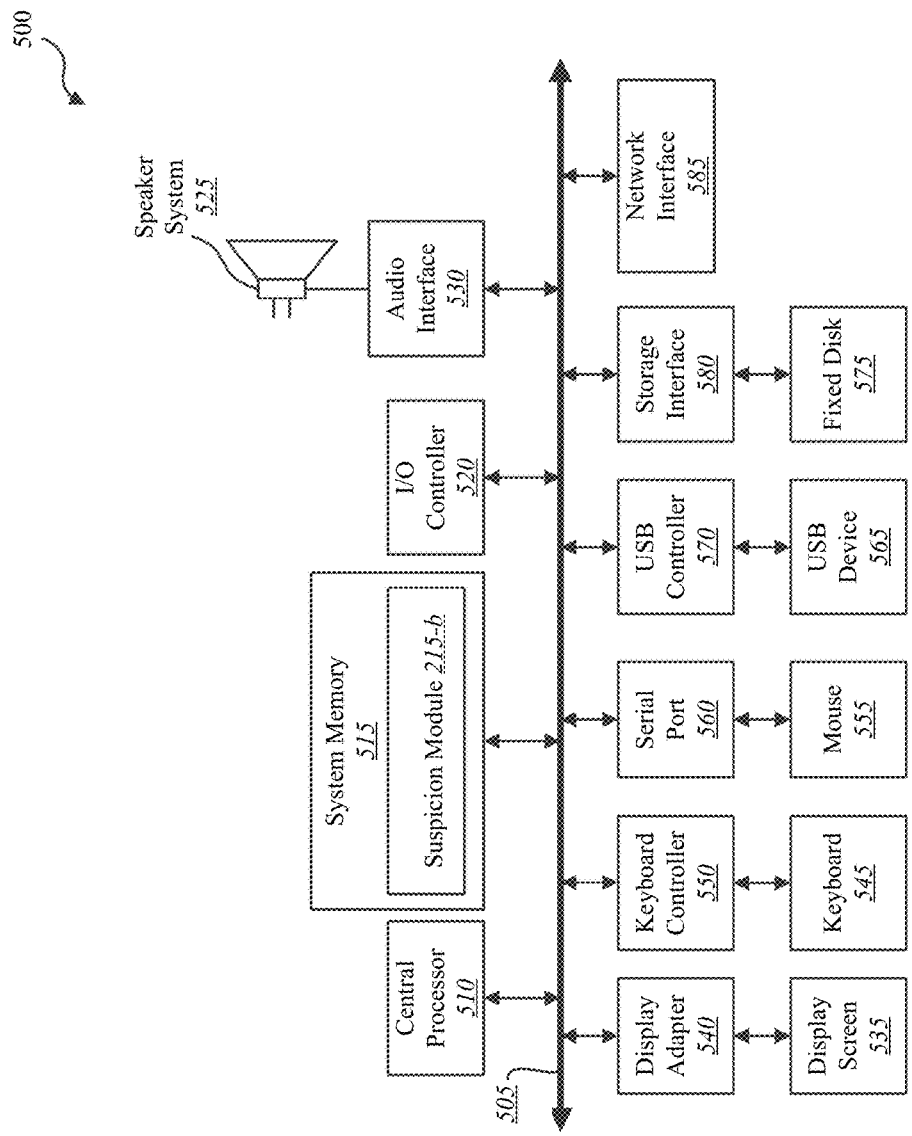
FIG. 5 depicts a block diagram of embodiments of a system suitable for implementing embodiments of the present systems and methods.

FIG. 5 depicts a block diagram of a controller 500 suitable for implementing the present systems and methods. The controller 500 may be an example of and/or relate to a device, an apparatus, a user device, an access point, a client device, a database, a computing unit, a wireless communication unit, a monitoring unit, a source unit, some combination, and/or other units. In some embodiments, controller 500 includes a bus 505 which interconnects components and/or elements of controller 500 including one or more of: a central processor 510, a system memory 515 (which may include random access memory (RAM), read-only memory (ROM), flash RAM, and/or similar memory), an input/output controller 520, an external audio device, such as a speaker system 525 via an audio output interface 530, an external device, such as a display screen 535 via display adapter 540, an input device 545 (e.g., remote control device interfaced with an input controller 550), a USB device 565 (in some cases interfaced with a USB controller 570), and a storage interface 580. Also included are at least one sensor 555 connected to bus 505 through a sensor controller 560 and a network interface 585 (in some cases coupled directly to bus 505).

Bus 505 allows data communication between central processor 510, system memory 515 (which may include ROM, flash memory, RAM, and/or similar memory, as previously noted), and/or other elements. One type of memory, such as RAM, may be the main memory into which the operating system and application programs are loaded. The ROM and/or the flash memory can contain, among other code, the Basic Input-Output system (BIOS) that controls basic hardware operation such as the interaction with peripheral components or devices. For example, the different modules (e.g., connection, initiation, monitoring, registering, determination, notification, termination, suspicion module 215-b, some combination, and/or others) to implement the present systems and methods may be stored within the system memory 515. Applications resident with controller 500 may be generally stored on and accessed via a non-transitory computer readable medium, such as a hard disk drive (e.g., fixed disk 575) and/or other storage medium. Additionally, applications may be in the form of electronic signals modulated in accordance with the application and data communication technology when accessed via interface 585.

Storage interface 580, as with the other storage interfaces of controller 500, can connect to a standard computer readable medium for storage and/or retrieval of information—such as a fixed disk 575. Fixed disk 575 may be a part of controller 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like. In some embodiments, one or more sensors (e.g., device sensors, network sensors, system sensors, authentication sensors, communication sensors, and/or power sensors, etc.) connect to controller 500 wirelessly via network interface 585.

Many other devices or subsystems may be connected in a similar manner (e.g., computing devices, access points, apparatuses, remote devices, transmitters, etc.). In addition, in some embodiments, all of the devices shown in FIG. 5 need not be present to practice the disclosed systems and methods. Moreover, in some embodiments, the devices and subsystems can be interconnected in different ways from that shown in FIG. 5. Some aspects of some operations of a system, such as that shown in FIG. 5, may be readily known in the art and are not discussed in detail in this application.

Code to implement the present disclosure can be stored in a non-transitory computer-readable medium such as one or more of system memory 515 or fixed disk 575. The operating system provided on controller 500 may be iOS®, ANDROID®, MS-DOS®, MS-WINDOWS®, OS/2®, UNIX®, LINUX®, and/or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments may be characterized as communicated from one block to the next, other embodiments of the present systems and methods may include modified signals in place of such directly communicated signals as long as the informational and/or functional aspect of the signal is communicated between blocks. To some extent, a signal input at a second block can be conceptualized as a second signal derived from a first signal output from a first block due to physical limitations of the circuitry involved (e.g., there will inevitably be some attenuation and delay). Therefore, as used here, a second signal derived from a first signal includes the first signal and/or any modifications to the first signal—whether due to circuit limitations or due to passage through other circuit elements which do not change the informational and/or final functional aspect of the first signal.

Figure 6:
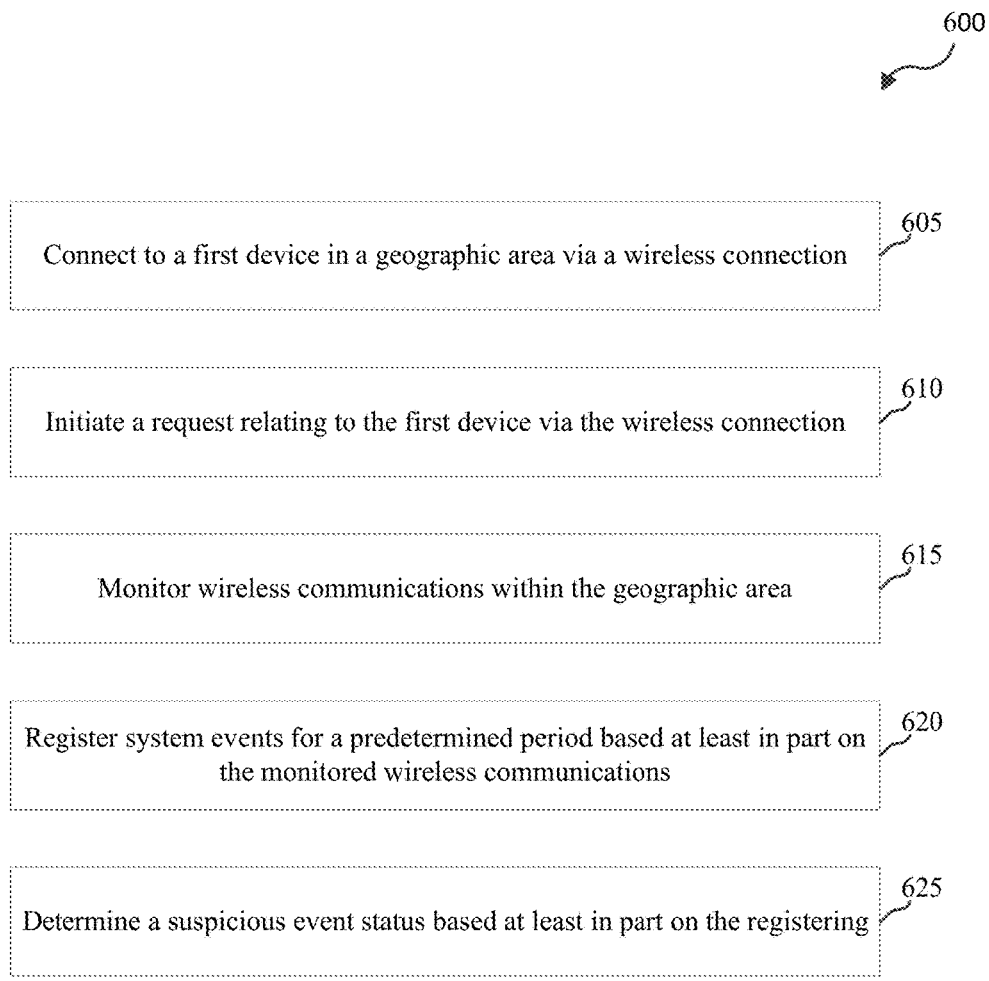
FIG. 6 depicts a block diagram illustrating embodiments of methods relating to the present systems and methods.

FIG. 6 shows exemplary methods 600 and systems in accordance with some embodiments. For clarity, the method 600 is described below with reference to aspects of one or more embodiments of the suspicion module 215, device 105 (or 205), apparatus 110, database 125, impersonation device 115, and/or others described with reference to FIGS. 1-5. In some examples, an apparatus, an access point, a device, a remote server, and/or one or more other components may execute one or more sets of codes to control the functional elements of an apparatus, an access point, a device, and/or one or more components to perform the functions described below. Additionally or alternatively, another component may perform one or more of the functions described below using special-purpose hardware.

In some embodiments, methods incorporating the present systems and methods may include connecting to a first device in a geographic area via a wireless connection, initiating a request relating to the first device via the wireless connection, monitoring wireless communications within the geographic area, registering system events for a predetermined period based at least in part on the monitored wireless communications, and/or determining a suspicious event status based at least in part on the registering—as shown in blocks 605-625. In some embodiments, any and/or all of these operations may be performed by, or at, one or more of: a device, a user unit, a client device, an apparatus, an access point, a network, a database, and/or other components, elements, and/or modules.

Thus, the method 600 may relate to impersonation detection relating to wireless communication systems. It should be noted that the method 600 is just one implementation and that the operations of the method 600 may be rearranged or otherwise modified such that other implementations are possible.

Figure 7:
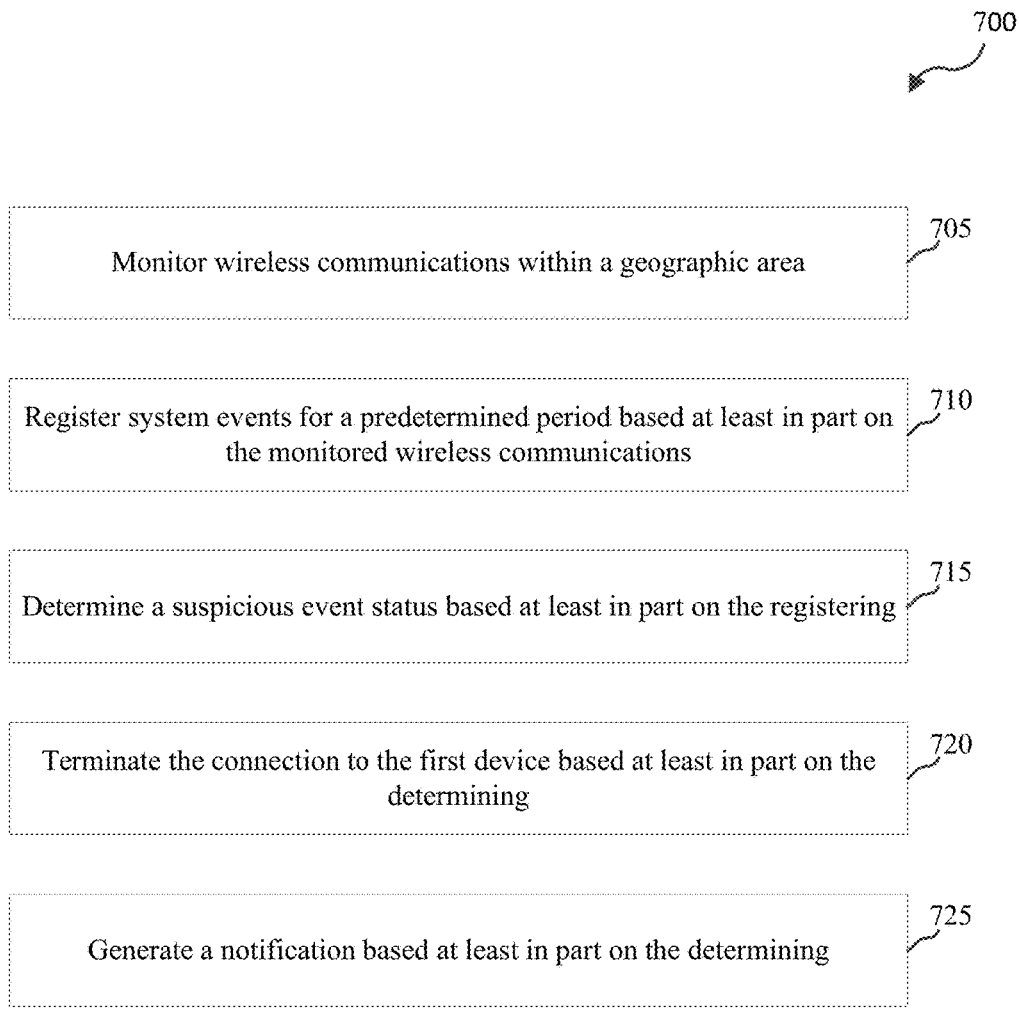
FIG. 7 depicts a block diagram illustrating embodiments of methods relating to the present systems and methods.

FIG. 7 shows exemplary methods 700 and systems in accordance with some embodiments. For clarity, the method 700 is described below with reference to aspects of one or more embodiments of the suspicion module 215, device 105 (or 205), apparatus 110, database 125, impersonation device 115, and/or others described with reference to FIGS. 1-5. In some examples, an apparatus, an access point, a device, a remote server, and/or one or more other components may execute one or more sets of codes to control the functional elements of an apparatus, an access point, a device, and/or one or more components to perform the functions described below. Additionally or alternatively, another component may perform one or more of the functions described below using special-purpose hardware.

In some embodiments, methods incorporating the present systems and methods may include monitoring wireless communications within a geographic area, registering system events for a predetermined period based at least in part on the monitored wireless communications, determining a suspicious event status based at least in part on the registering, terminating the connection to the first device based at least in part on the determining, and/or generating a notification based at least in part on the determining—as shown in blocks 705-725. In some embodiments, any and/or all of these operations may be performed by, or at, one or more of: a device, a user unit, a client device, an apparatus, an access point, a network, a database, and/or other components, elements, and/or modules.

Thus, the method 700 may relate to impersonation detection relating to wireless communication systems. It should be noted that the method 700 is just one implementation and that the operations of the method 700 may be rearranged or otherwise modified such that other implementations are possible.

Figure 8:
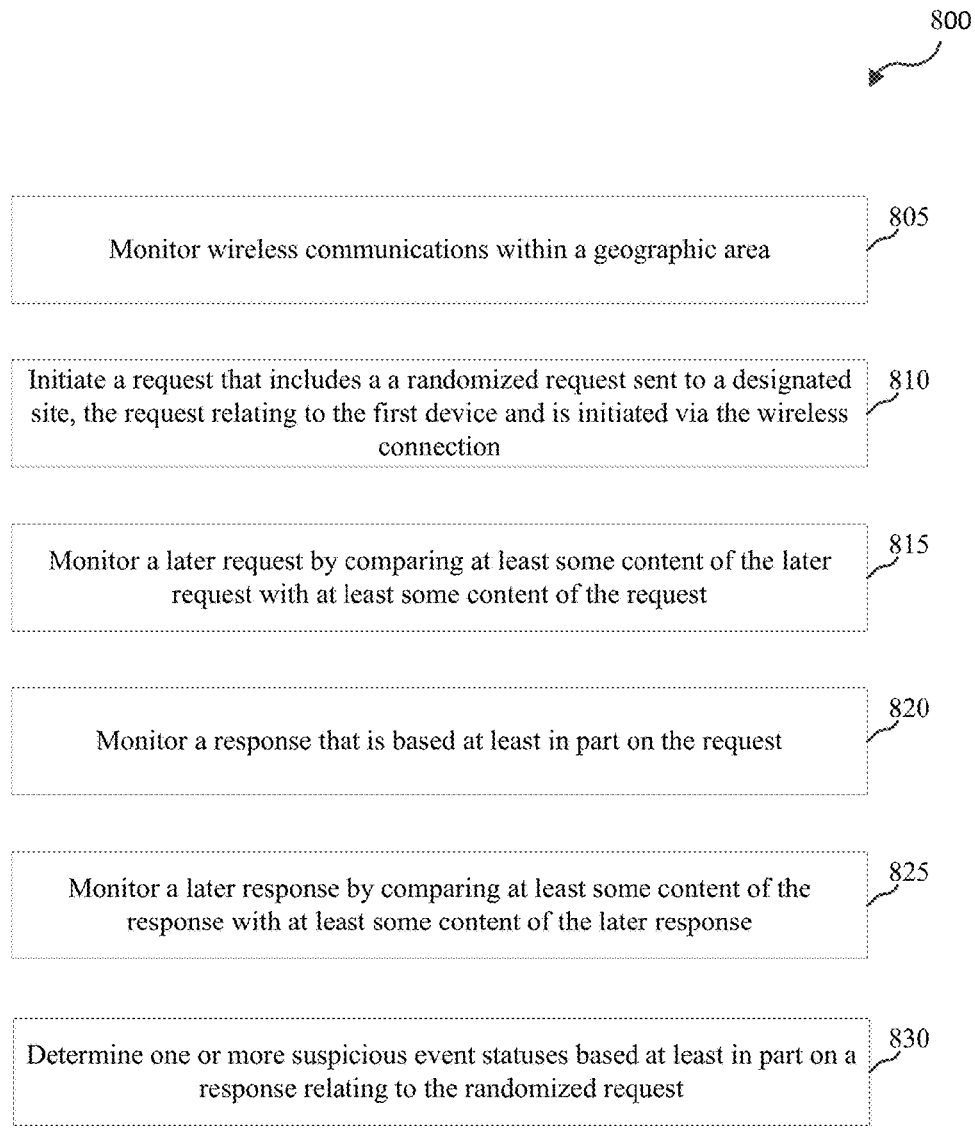
FIG. 8 depicts a block diagram illustrating embodiments of methods relating to the present systems and methods.

FIG. 8 shows exemplary methods 800 and systems in accordance with some embodiments. For clarity, the method 800 is described below with reference to aspects of one or more embodiments of the suspicion module 215, device 105 (or 205), apparatus 110, database 125, impersonation device 115, and/or others described with reference to FIGS. 1-5. In some examples, an apparatus, an access point, a device, a remote server, and/or one or more other components may execute one or more sets of codes to control the functional elements of an apparatus, an access point, a device, and/or one or more components to perform the functions described below. Additionally or alternatively, another component may perform one or more of the functions described below using special-purpose hardware.

In some embodiments, methods incorporating the present systems and methods may include monitoring wireless communications within a geographic area, initiating a request that includes a randomized request sent to a designated site where, the request relates to the first device and is initiated via the wireless connection, monitoring a later request by comparing at least some content of the later request with at least some content of the request, monitoring a response that is based at least in part on the request, monitoring a later response by comparing at least some content of the response with at least some content of the later response, determining a suspicious event status based at least in part on a response relating to the randomized request—as shown in blocks 805-830. In some embodiments, any and/or all of these operations may be performed by, or at, one or more of: a device, a user unit, a client device, an apparatus, an access point, a network, a database, and/or other components, elements, and/or modules.

Thus, the method 800 may relate to impersonation detection relating to wireless communication systems. It should be noted that the method 800 is just one implementation and that the operations of the method 800 may be rearranged or otherwise modified such that other implementations are possible.

While this disclosure sets forth various embodiments using specific block diagrams, flowcharts, and examples, each block diagram component, flowchart step, operation, and/or components described and/or illustrated here may be implemented—individually and/or collectively—using a wide range of hardware, software, and/or firmware (or any combination thereof) configurations. In addition, any disclosure of components contained within other components should be considered exemplary in nature since many other architectures can be implemented to achieve the same functionality, including combining multiple elements in one or more unitary structures (e.g., a unitary housing, an integrated housing, etc.) and/or separate structures.

The process parameters and sequence of steps described and/or illustrated here are given by way of example only and can be varied as desired. For example, while the steps illustrated and/or described herein may be shown or discussed in a particular order, these steps do not necessarily need to be performed in the order illustrated or discussed. The various exemplary methods described and/or illustrated here may also omit one or more of the steps described and/or illustrated, and/or may include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

This description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, the discussion of a single element, operation, and/or idea, including an application and/or a workspace, should not be construed as being limited to the single element, operation, and/or idea, but may also include multiple elements, operations, and/or ideas. In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for detecting electronic communication impersonation, comprising:
    connecting to a first device in a geographic area via a wireless connection;
    initiating a request relating to the first device via the wireless connection, wherein the request comprises a randomized request sent to a designated source before other wireless communications are sent;
    monitoring wireless communications within the geographic area;
    registering system events for a predetermined period based at least in part on the monitoring;
    identifying a second request initiated by a second device based at least in part on the registering, the second request relating to the first device, wherein the registered system events comprise network traffic associated with the first device and the second device;

comparing the initiated request and the second request;

identifying that at least a portion of the initiated request is identical to at least a portion of the second request based at least in part on the comparing;

analyzing, from the registered system events, at least a portion of the network traffic associated with the first device and the second device;

determining a suspicious event status relating to the second device based at least in part on the analyzing, wherein the suspicious event status is based at least in part on the registered system events exceeding a confidence threshold that the at least portion of the network traffic was repeated by the first device and the second device, wherein determining the suspicious event status is based at least in part on a response relating to the randomized request; and transmitting, to the first device, an indication of the suspicious event status relating to the second device.

2. The method of claim 1, further comprising:
terminating the wireless connection to the first device based at least in part on the determining.

3. The method of claim 1, further comprising:
generating a notification based at least in part on the determining.

4. The method of claim 3, wherein the notification comprises:
a communication to a user device.

5. The method of claim 1, wherein the request comprises:
one or more application layer protocol requests.

6. The method of claim 1, wherein the request is initiated by a user device.

7. The method of claim 1, wherein monitoring wireless communications within the geographic area comprises:
monitoring information relating to communication packets.

8. The method of claim 1, wherein monitoring wireless communications comprises:
monitoring for an echo of the request.

9. The method of claim 1, wherein monitoring wireless communications comprises:
monitoring for a later request initiated by the second device that is identical to the request.

10. The method of claim 1, wherein monitoring wireless communications comprises:
monitoring for a later request identical to the request.

11. The method of claim 1, wherein monitoring wireless communications comprises:
monitoring a later request by comparing at least a portion of content of the later request with at least a portion of content of the request.

12. The method of claim 1, further comprising:
monitoring a response that is based at least in part on the request;
wherein monitoring wireless communications comprises:
monitoring a later response by comparing at least a portion of content of the response with at least a portion of content of the later response.

13. The method of claim 12, wherein the response comprises:
communication between an access point and an intermediate device; and
wherein the later response comprises:
communication between the intermediate device and a user device.

14. The method of claim 1, wherein the suspicious event status indicates at least one of a qualitative measure or a quantitative measure of an impersonation process.

15. The method of claim 1, wherein monitoring wireless communications within the geographic area comprises:
monitoring public Wi-Fi traffic within the geographic area.

16. A computing device for detecting electronic communication impersonation, comprising:
a processor;
memory in electronic communication with the processor, wherein the memory stores computer executable instructions that when executed by the processor cause the processor to perform the steps of:
connecting to a first device in a geographic area via a wireless connection;
initiating a request relating to the first device via the wireless connection, wherein the request comprises a randomized request;
monitoring wireless communications within the geographic area;
registering system events for a predetermined period based at least in part on the monitoring;
identifying a second request initiated by a second device based at least in part on the registering, the second request relating to the first device, wherein the registered system events comprise network traffic associated with the first device and the second device;
comparing the initiated request and the second request;
identifying that at least a portion of the initiated request is identical to at least a portion of the second request based at least in part on the comparing;
analyzing, from the registered system events, at least a portion of the network traffic associated with the first device and the second device;
determining a suspicious event status relating to the second device based at least in part on the analyzing, wherein the suspicious event status is based at least in part on the registered system events exceeding a confidence threshold that the at least portion of the network traffic was repeated by the first device and the second device, wherein determining the suspicious event status is based at least in part on a response relating to the randomized request; and
transmitting, to the first device, an indication of the suspicious event status relating to the second device.

17. The computing device of claim 16, wherein monitoring wireless communications comprises:
monitoring a later request by comparing at least a portion of content of the later request with at least a portion of content of the request.

18. A non-transitory computer-readable storage medium storing computer executable instructions that when executed by a processor cause the processor to perform the steps of:
connecting to a first device in a geographic area via a wireless connection;
initiating a request relating to the first device via the wireless connection, wherein the request comprises a randomized request;
monitoring wireless communications within the geographic area;
registering system events for a predetermined period based at least in part on the monitoring;
identifying a second request initiated by a second device based at least in part on the registering, the second request relating to the first device, wherein the registered system events comprise network traffic associated with the first device and the second device;

comparing the initiated request and the second request;

identifying that at least a portion of the initiated request is identical to at least a portion of the second request based at least in part on the comparing;

analyzing, from the registered system events, at least a portion of the network traffic associated with the first device and the second device;

determining a suspicious event status relating to the second device based at least in part on the analyzing, wherein the suspicious event status is based at least in part on the registered system events exceeding a confidence threshold that the at least portion of the network traffic was repeated by the first device and the second device, wherein determining the suspicious event status is based at least in part on a response relating to the randomized request; and transmitting, to the first device, an indication of the suspicious event status relating to the second device.

* * * * *